United States Patent
Meyer et al.

(10) Patent No.: US 11,135,885 B2
(45) Date of Patent: Oct. 5, 2021

(54) MOTOR VEHICLE CONTROL ARM, AND METHOD FOR PRODUCING A MOTOR VEHICLE CONTROL ARM

(71) Applicant: BENTELER AUTOMOBILTECHNIK GMBH, Paderborn (DE)

(72) Inventors: Stephan Meyer, Bielefeld (DE); Frode Paulsen, Goevic (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 59 days.

(21) Appl. No.: 16/677,804

(22) Filed: Nov. 8, 2019

(65) Prior Publication Data

US 2020/0148020 A1 May 14, 2020

(30) Foreign Application Priority Data

Nov. 9, 2018 (DE) ...................... 10 2018 128 077.7

(51) Int. Cl.
*B60G 3/22* (2006.01)
*B23P 15/00* (2006.01)
*B60G 7/00* (2006.01)

(52) U.S. Cl.
CPC .............. *B60G 3/225* (2013.01); *B23P 15/00* (2013.01); *B60G 7/001* (2013.01); *B60G 2204/418* (2013.01); *B60G 2206/011* (2013.01); *B60G 2206/012* (2013.01); *B60G 2206/124* (2013.01); *B60G 2206/7102* (2013.01); *B60G 2206/8105* (2013.01)

(58) Field of Classification Search
CPC ...... B60G 2206/011; B60G 2206/8105; B60G 2206/811; B60G 2206/8111; B60G 2206/8103; B60G 2206/012; B60G 2206/124; B60G 3/225; B60G 7/001
USPC .......................................... 29/897.2
See application file for complete search history.

(56) References Cited

U.S. PATENT DOCUMENTS

2011/0285102 A1 11/2011 Yu et al.
2018/0326803 A1* 11/2018 Meyer ................... B60G 7/001

FOREIGN PATENT DOCUMENTS

| DE | 112009002671 T5 | 2/2013 | |
| DE | 102014220444 A1 | 4/2016 | |
| DE | 102017109996 A1 | 11/2018 | |
| FR | 3074727 A1 * | 6/2019 | ............. B60G 7/001 |

(Continued)

OTHER PUBLICATIONS

Office Action for German Application No. 10 2018 128 077.7 dated Jul. 22, 2019; 10pp.

*Primary Examiner* — Paul N Dickson
*Assistant Examiner* — Matthew D Lee
(74) *Attorney, Agent, or Firm* — Hauptman Ham, LLP

(57) ABSTRACT

The disclosure relates to a motor vehicle control arm, like a wishbone, having an integral main body configured in a materially integral manner. A first bearing receptacle is connected to the main body. The main body has a first end portion having a second bearing receptacle, and a second end portion having a third bearing receptacle. The main body comprises a central portion. Said central portion connects the first and the second end portion. The central portion is configured as a cavity profile. The second and the third bearing receptacle are configured integrally and in a materially integral manner from the main body.

5 Claims, 3 Drawing Sheets

(56) References Cited

FOREIGN PATENT DOCUMENTS

| JP | 02169312 | A | * | 6/1990 | ............. | B60G 7/001 |
| JP | 05185171 | A | * | 7/1993 | ............ | B21C 23/142 |
| JP | 05220535 | A | * | 8/1993 | ............. | B21C 23/14 |
| JP | 2001132728 | A | * | 5/2001 | ............ | B23K 20/122 |
| JP | 2015009354 | A | * | 1/2015 | | |

* cited by examiner

MOTOR VEHICLE CONTROL ARM, AND METHOD FOR PRODUCING A MOTOR VEHICLE CONTROL ARM

CROSS-REFERENCE TO RELATED APPLICATION(S)

The present application claims priority to German Application Number 10 2018 128 077.7 filed Nov. 9, 2018, the disclosure of which is hereby incorporated by reference herein in its entirety.

FIELD

The present application relates to a motor vehicle control arm, like a wishbone.

BACKGROUND

Motor vehicle control arms are usually embodied as sheet-metal control arms, hybrid control arms, or forged control arms. Such a motor vehicle control arm is typically implemented by way of a control arm body having at least one bearing receptacle for receiving a bearing.

For example, a wishbone which is configured as a two-piece welded component is disclosed in DE 10 2006 051 609 A1. Two shell elements herein mutually engage in a form-fitting manner and are joined to one another by welding technology. Such a control arm is very complex in terms of the production method thereof since the various components are produced separately from one another and have to be precisely joined so as to form one component. On account thereof, extreme requirements are set in terms of the precision of the geometry be achieved. Weld seams in the case of wishbones of this type always represent potential weak spots.

As a further example, a wishbone from DE 10 2010 006 284 A1 is to be mentioned, said wishbone being configured as a casting. Such control arms in terms of the production thereof are indeed cost effective but have a high dead weight and require complex mechanical post-machining. Wishbones herein are cast in molds and subsequently cooled and subtractively machined, bearing receptacles being incorporated in the wishbone in this way, for example.

SUMMARY

It is thus an object of one or more embodiments of the present disclosure to make available a motor vehicle control arm which has a lower weight and which is easy and cost-effective to produce, and to make available a production method for such a motor vehicle control arm.

A motor vehicle control arm according to one or more embodiments of the disclosure, like a wishbone, has an integral main body configured in a materially integral manner, as well as a first bearing receptacle connected to the main body, wherein the main body comprises a first end portion having a second bearing receptacle, and a second end portion having a third bearing receptacle, as well as a central portion connecting said end portions, wherein the second and the third bearing receptacle are configured integrally and in a materially integral manner from the main body, and the central portion is configured as a cavity profile.

On account of at least one example embodiment of the central portion, material and weight are significantly reduced and a high stability is achieved in comparison to control arms of other approaches.

Additional corrugations may be incorporated in the central portion in order for the hollow member to be additionally reinforced.

In the case of control arms of other approaches, the bearing receptacles are in most instances fabricated separately and coupled to the end portions. On account thereof, potential weak spots are created in the end portions of the control arm since the bearing receptacles are screw-fitted, riveted, or welded, for example. An increase in weight arises in the end portions on account of the coupling elements. Such a weak spot or a weight increase is dispensed with at the end portions of the control arm since the end portions having the second and the third bearing receptacles are configured integrally and in a materially integral manner from the main body. An operator step is dispensed with, this rendering the control arm simpler and more cost-effective in production.

One embodiment for receiving the first bearing receptacle has two flanges that project in a parallel and mutually spaced apart manner from the cavity profile. Said first bearing receptacle can be made of a material that is dissimilar to that of the main body. On account thereof, dissimilar bearings can be incorporated in the first bearing receptacle, and dissimilar suspension components can thus be catered to. It can thus be ensured that the first bearing receptacle opening is perpendicular to the second and the third bearing receptacle opening. The functionality of the control arm is thus provided.

At least one aperture for rivets, screws, or similar is incorporated in the flanges as an additional fixing location of the first bearing receptacle on the main body. However, it is also possible for the first bearing receptacle be attached in a materially integral manner, that is to say by means of welding or adhesive-bonding technology, for example.

In one further embodiment, the main body has a curved shape. On account of the shape, it is possible for a connection element between the body of a vehicle and the wheel trunk be made available with the aid of three linking points.

The main body on one side has a band which is connected in a materially integral manner to the main body as one piece thereof and which connects the first end portion having a second bearing receptacle to the second end portion having the third bearing receptacle. The band is disposed such that said band stabilizes the region of the main body in which high forces act. Said region is situated between the first and the second end portion on the concave side of the control arm. The curved main body of a motor vehicle control arm is thus imparted increased stability on account of said band.

For this reason, the main body comprises the first bearing receptacle in the form of the flanges on the convex side of the main body.

In the case of at least one example embodiment, a band which is connected in a materially integral manner to the main body as one piece thereof and which connects the first end portion having a second bearing receptacle to the second end portion having the third bearing receptacle is provided on the concave side of the main body. The curved main body of a motor vehicle control arm is imparted increased stability on account of said band.

For example embodiments of such a curved motor vehicle control arm, dissimilar bearings can be incorporated in the bearing receptacles provided therefor. At least one of the second and the third bearing receptacle is thus provided for receiving a ball joint.

For another example embodiment of such a curved motor vehicle control arm, at least one of the second and the third bearing receptacle is provided for receiving a rubber bearing.

One or more embodiments of the disclosure provide that at least one of the second and the third bearing receptacle is configured as a post. The post can serve as a bearing pin. Such a bearing pin is configured for receiving a bearing which can in particular be a hydraulic mount. Since the post is configured from the main body so as to be integral thereto, stress peaks which are created with a view to loading can be optimized. The machining is performed in the form of cutting, milling, or punching.

In one further embodiment of such a curved motor vehicle control arm the cavity profile in the central portion has a plurality of cavity chambers that are separated by webs. The webs point in the direction of the curvature of the main body. An additional stiffness of the main body can be achieved on account of this example embodiment.

The main body of such a suspension control arm is produced from an extruded profile. The profile for a plurality of main bodies can thus be fabricated in one extrusion step, on account of which the costs in terms of production can be significantly reduced.

The extruded profile for the main body of the suspension control arm has three portions that are mutually contiguous transversely to the extruding direction. A first portion has two collars which are disposed in a mutually parallel and spaced apart manner and which by way of the free end thereof point away from the extruded profile. A second portion is configured from at least one cavity chamber. A plurality of cavity chambers can thus be configured so as to be mutually separated by webs which are configured along the extruding direction. A third portion is configured as a solid material. A solid material here describes a region which in terms of the entire volume thereof is made of the extruded material and does not have any cavities. Two material protrusions which point away from the at least one cavity chamber are thus present transversely to the extruding direction across the entire length of the extruded profile. The material protrusions are disposed in a mutually parallel manner and mutually spaced apart so as to correspond to the height of the extruded profile.

The flanges are configured from the collars. The flanges can be configured from the collars of the extruded profile by cutting technology or by another type of mechanical machining.

The cavity profile is configured from at least one cavity chamber. The individual cavity chambers are formed by webs which are situated longitudinally in relation to the extruding direction. The second portion of the extruded profile thus forms the central portion of the main body of the motor vehicle control arm, said central portion being embodied as a cavity profile. Since said central portion is configured as a cavity profile, said central portion has a high stiffness and a low weight. The stiffness can be adapted by varying the number of cavity chambers.

The first and the second bearing receptacle are configured from the solid material. The third portion of the extruded profile thus forms the first and the second end portion of the main body, having the bearing receptacles disposed therein. On account of the use of the solid material, the end portions have a high stability in order for the bearing receptacles to be formed.

Besides the first and the second end portion of the main body, the third portion of the extruded profile in at least one example embodiment forms the band that connects the end portions of the main body to one another. The central portion of the main body is additionally supported by said band, and the stability is additionally increased.

The method for producing a motor vehicle control arm, like a wishbone, comprises the following method steps:
    extruding a continuous aluminum profile which transversely to the extruding direction comprises the following three mutually contiguous portions:
        a first portion having two collars which are disposed in a mutually parallel and spaced apart manner and which by way of the free end thereof point away from the extruded profile;
        a second portion which is configured from at least one cavity chamber; and
        a third portion which is configured as a solid material;
    cutting to length the profile;
    bending the profile such that the first portion is curved in a concave manner, and the third portion is curved in a convex manner; and.
    mechanically machining the profile for configuring a main body of the control arm.

This production method of the control arm represents a simple and cost-effective method for producing vehicle control arms which have a stable main body and contain corresponding bearing receptacles for dissimilar bearings.

One or more embodiments of the disclosure provides that a main body having a first end portion having a second bearing receptacle, and a second end portion having a third bearing receptacle, as well as a central portion connecting said end portions, is configured when cutting. The mutual interaction of the end portions and the bearing receptacles is possible on account of the connection of the end portions.

In one method for producing a motor vehicle control arm, the second and the third bearing receptacle are configured from the solid material of the third portion. To this end, bearing receptacle openings which have an internal contour that is complementary to the associated bearings are incorporated in the two end portions by cutting, punching, or milling.

The second and/or the third bearing receptacle are/is configured as a recess and/or a post. Rubber-metal bearings or ball joints can be incorporated in the recess.

An alternative production method lies in that one of the second or the third bearing receptacle has a post as a bearing pin. For such an embodiment, one of the two end portions is cut in such a manner that a web which serves for mounting a bearing remains from the solid material.

The end portion is mechanically machined in such a manner that the first and the second portion of the extruded profile are removed. The third portion is removed down to the diameter of the post in such a manner that the solid material which is contiguous to the second portion represents the post. The outer solid material is removed like the first and the second portion. On account of this machining it is possible for the bearing to be symmetrically received.

One further embodiment of the method provides that the central portion is configured from the at least one cavity chamber of the second portion. The extruded profile is cut in such a manner that the central portion is made of the at least one cavity chamber of the second portion of the extruded profile. The central portion when cutting is chamfered in such a manner that the end portions are made of the solid material, and the connecting central portion is configured from the at least one cavity chamber. On account of this cutting, the main body of a motor vehicle control arm is configured so as to be stable and of low weight.

Flanges for receiving the first bearing receptacle are configured from the collars of the first portion. The collars of the first portion of the extruded profile on the convex side, for producing the main body of the control arm, are removed down to a locally delimited region up to the contiguous second portion of the extruded profile. The region in which the collars are maintained thus forms the flange region for receiving the first bearing receptacle. The flange region is situated in the region of the saddle point of the curved main body.

The first bearing receptacle is non-releasably coupled to the main body. The flange region formed by the collars of the first portion of the extruded profile serves to this end. To this end, the connection portion of a bearing receptacle is brought between the two flanges and fixed to the main body of the control arm. This can be performed in a form-fitting manner, for example by means of screws, bolts, or rivets, or else in a materially integral manner, for example by welding, soldering/brazing, or adhesive-bonding technology.

It is thus possible for bearing receptacles which are made of a material that is dissimilar to that of the main body to be non-releasably coupled to the main body.

In the method, a band connecting the first and the second end portion is configured from the solid material of the third portion. The extruded profile is cut such that a band remains configured on the concave periphery of the central portion, said band additionally connecting the first and the second end portion. Said band is associated with the main body and is thus configured so as to be integral thereto and in a materially integral manner thereto. The central portion is additionally supported and stabilized on account of said band.

Aluminum alloys of the types 6000 and/or 7000 are used in the production method of the motor vehicle control arm according to one or more embodiments of the disclosure.

BRIEF DESCRIPTION OF THE DRAWINGS

For an understanding of embodiments of the disclosure, reference is now made to the following description taken in conjunction with the accompanying drawings, in which.

In the figures, the same reference numerals are used for identical or similar components, even though a repeated description is omitted for reasons of simplification.

DETAILED DESCRIPTION

Figure 1:
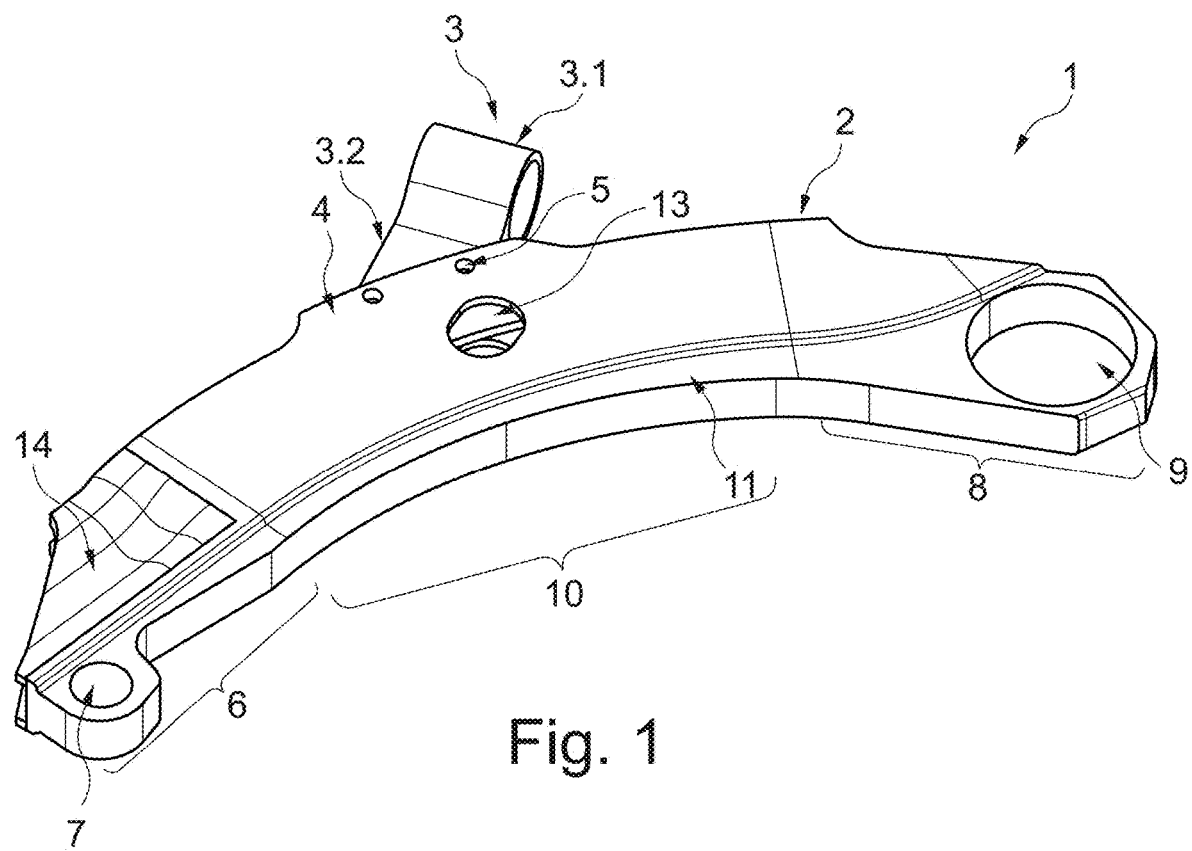
FIG. 1 shows a first embodiment of a wishbone in a first perspective.

A control arm (1) which is produced from an extruded aluminum profile (16) is illustrated in FIG. 1. Said control arm (1) has a main body (2) to which a first bearing receptacle (3) is non-releasably coupled. The coupling is enabled by two parallel and mutually spaced apart flanges (4) which are connected integrally and in a materially integral manner to the main body (2) on the convex side of the latter. Said flanges (4) have at least one aperture (5) for fixing the bearing receptacle (3). The aperture is then penetrated by a screw, a bolt, or another connection element. The bearing receptacle (3) can be made of a material other than that of the main body.

The control arm has a first end portion (6) having a second bearing receptacle (7), and a second end portion (8) having a third bearing receptacle (9). The end portions (6, 8) are formed from a solid material. A solid material here describes a region which in terms of the entire volume thereof is made of the extruded material and does not have any cavities. The bearing receptacles (7, 9) are incorporated in the control arm (1) by cutting, milling, punching, or boring. The end portions (6, 8) are adapted to the respective installation space in the vehicle by way of final mechanical machining. The end portions (6, 8) are connected to one another in an integral and materially integral manner by way of a central portion (10). The central portion (10) is formed from a cavity profile (12) and on the concave side has a band (11), likewise made of the solid material.

Figure 2:
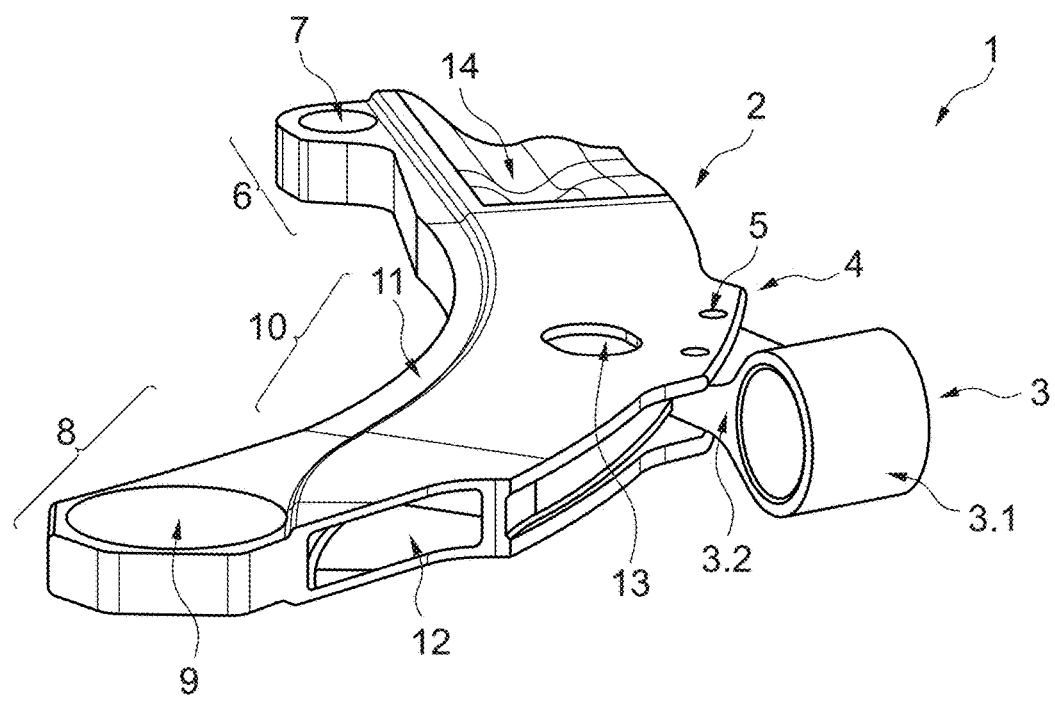
FIG. 2 shows a first embodiment of a wishbone in a second perspective.

Such a control arm (1) from FIG. 1 is shown in a rear view in FIG. 2. It can be readily seen here that the central portion (10) comprises a cavity profile (12) and has a curved shape. A band (11) from the solid material, which is connected to the central portion in a materially integral and integral manner, is provided on the concave side of the central portion. Two parallel and mutually spaced apart flanges (4) are disposed on the convex side in the region of the saddle point, and a first bearing receptacle (3) can be non-releasably coupled between said flanges. At least one aperture (5) in the flanges serves for fixing the first bearing receptacle. On account thereof, the first bearing receptacle (3) can be coupled to the main body (2) with the aid of screws, bolts, and/or rivets. The first bearing receptacle has a cylindrical hollow shape (3.1) in which a bearing is incorporated. The cylindrical hollow member (3.1) in a materially integral and integral manner is equipped with a connection region (3.2). Said region is brought between the flanges (4) and there is non-releasably coupled to the main body.

The central portion (10) is cut so as to be oblique in the direction of the end portions (6, 8) such that the cavity profile (12) extends across the central portion, and the solid material is present in the end portions (6, 8).

For reducing weight, the control arm (1) has recesses (13) in the region of the central portion (10). The recesses (13) of this type can also be incorporated in the band (11) in the regions of the end portions (20), this not being illustrated in more detail here. Said recesses (13) are generated by punching, milling, or boring. The incorporation of corrugations (14) in the central portion (10) is also possible for additional reinforcement.

Figure 3:
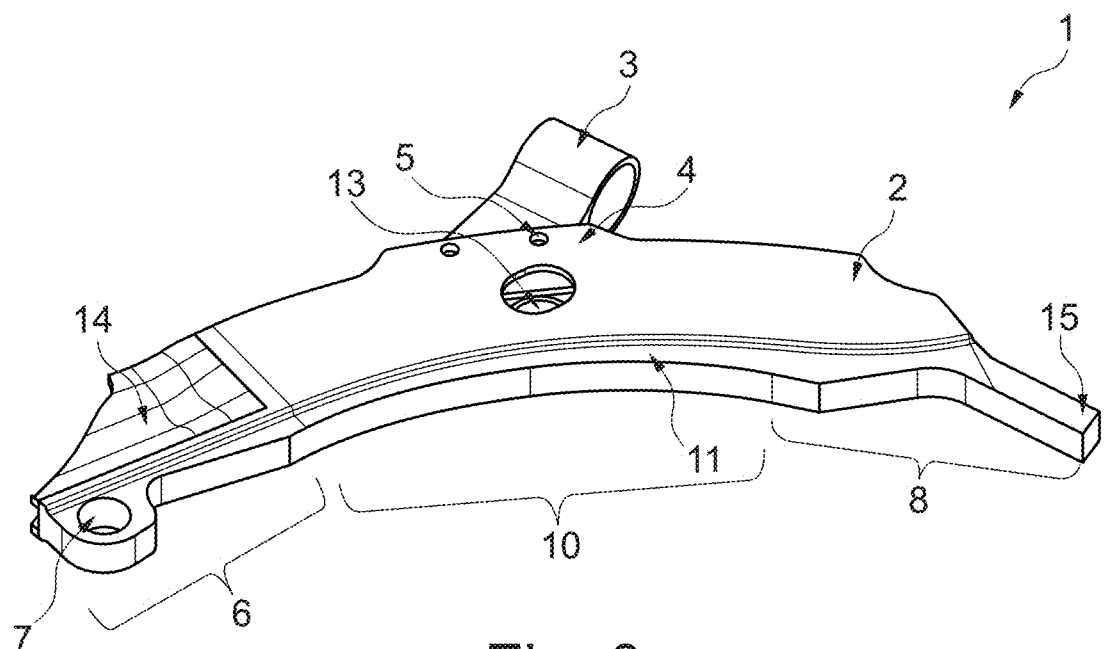
FIG. 3 shows a second embodiment of a wishbone.

FIG. 3 shows a further example embodiment of the control arm (1). Said control arm (1) has the same features as the control arm (1) illustrated in FIGS. 1 and 2. By contrast thereto, the third bearing receptacle (9) in the second end portion (8) is however embodied as a post (15). Said post (15), made of solid material, serves as a bearing pin.

Figure 4:
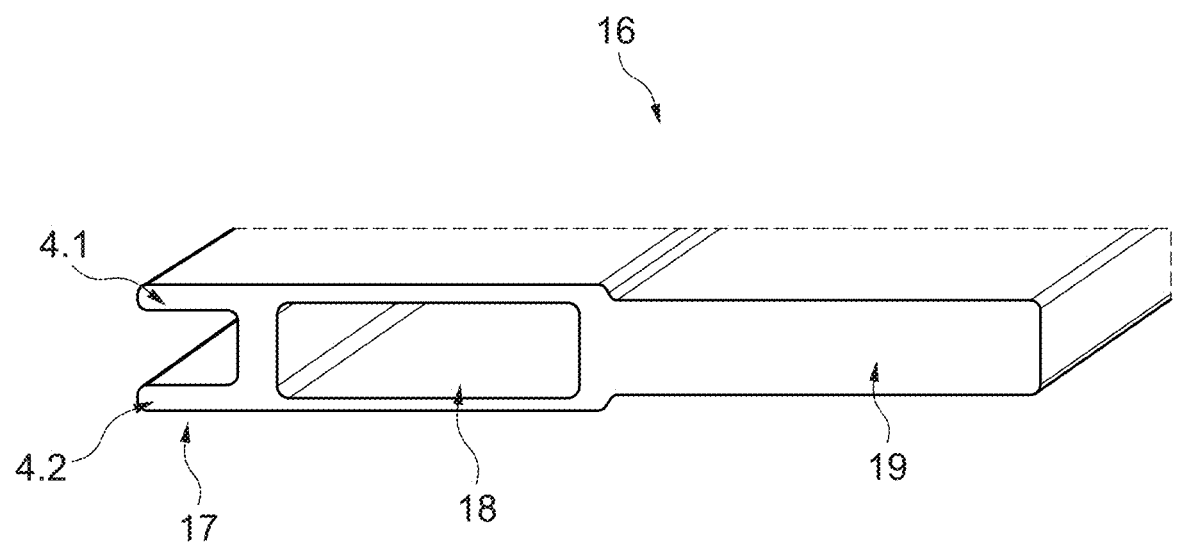
FIG. 4 shows an extruded profile for producing a wishbone according to one or more embodiments of the disclosure.

FIG. 4 shows the extruded profile (16) according to one or more embodiments of the disclosure from which the control arm (1) is made. Said extruded profile (16) transversely to the extrusion direction has three mutually contiguous portions. A first portion (17) has two collars (4.1, 4.2) which are disposed in a mutually parallel and spaced apart manner and which by way of the free end thereof point away from the extruded profile and in the case of the control arm (1) form the flanges (4) for coupling the first bearing receptacle (3). The collars (4.1, 4.2) are made of material protrusions which across the entire length of the extruded profile (16) are disposed in a mutually parallel manner and mutually spaced apart so as to correspond to the height of the extruded profile. The individual collars have a diameter of 3 to 18 mm, or 5 to 17 mm, or 6 to 15 mm.

A second portion (18) is configured from at least one cavity chamber and thus forms the cavity profile (12) for the main body (2). The walls of the at least one cavity chamber herein have diameters of 2.5 to 9 mm, or 3 to 8 mm, or 4 to 7 mm.

The collars of the first portion thus have a greater wall thickness than the walls of the at least one cavity chamber of the second central portion.

A third portion (19) is configured as a solid material. Said third portion (19) in the finished control arm (1) forms the two end portions (6, 8) and the connecting band (11). Solid material here means that no cavity chambers are enclosed across the entire volume of the third portion (19), and the third portion (19) is made of one material. The wall thickness of the third portion has a diameter of 8 to 20 mm, or 9 to 19 mm, or 10 to 18 mm.

The third portion thus has a greater wall thickness than the walls of the first portion and/or than the walls of the second portion.

The profile (16) is continuously extruded and cut to length according to requirements. Aluminum alloys of the type 6000 and 7000 are used for extruding.

Figure 5:
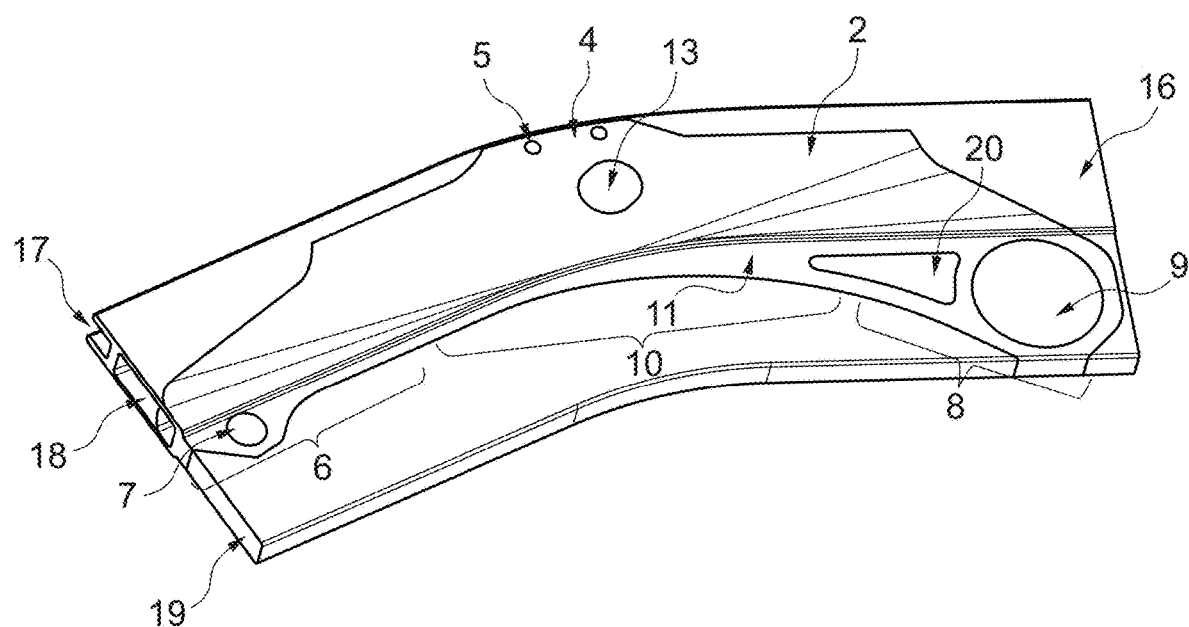
FIG. 5 shows an illustration of the extruded profile superimposed with the provided main body of the motor vehicle control arm.

FIG. 5 shows the extruded profile (16) which is already bent such that the first portion (17) is convexly curved and the third portion (19) is concavely curved. The extruded profile (16) is superimposed with the main body (2) of the control arm (1) according to one or more embodiments of the disclosure. It becomes obvious in this illustration how the main body (2) is created from the extruded profile (16). To this end, the extruded profile (16) is mechanically machined so as to correspond to the envisaged shape of the main body (2), that is to say punched, milled, or cut. Besides the main shape (2), the recesses (13) in the cavity profile (12) are already indicated here. Potential recesses (20) in the region of the end portions (6, 8) are also ready illustrated. In comparison to other approaches, which lies in that the main body is established by way of a few steps is demonstrated here. The production is thus simple and readily reproducible in comparison to the other approaches.

After the production of the main body (2) and the coupling of the first bearing receptacle (3), the control arm (1) is post-machined, and bearings are incorporated in the bearing receptacles (3, 7, 9) of the control arm in a materially integral and/or form-fitting and/or force-fitting manner herein.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A process for producing a motor vehicle control arm, the process comprising:
   extruding a continuous aluminum profile which, transversely to the extruding direction, comprises the following mutually contiguous portions:
       a first portion having two collars which are disposed in a mutually parallel and spaced apart manner and which have free ends thereof pointing away from the extruded profile,
       a second portion which has at least one cavity chamber, and
       a third portion which is configured as a solid block;
   cutting the profile to length;
   bending the cut profile such that the first portion is curved in a concave manner, and the third portion is curved in a convex manner; and
   mechanically machining the bent profile for configuring a main body of the control arm.

2. The process according to claim 1, wherein the main body having a first end portion having a second bearing receptacle, and a second end portion having a third bearing receptacle, and a central portion connecting said first and second end portions, is configured upon said cutting.

3. The process according to claim 2, wherein the second and the third bearing receptacles are configured from the solid block of the third portion, at least one of the second bearing receptacle or the third bearing receptacle is configured as a recess or a post, the central portion is configured from the at least one cavity chamber of the second portion, and flanges for receiving a first bearing receptacle are configured from the collars of the first portion.

4. The process according to claim 1, further comprising:
   non-releasably coupling a first bearing receptacle to the main body.

5. The process according to claim 1, wherein a band connecting the second and the third bearing receptacles are configured from the solid block.

* * * * *